(12) United States Patent
Kreysar et al.

(10) Patent No.: US 7,697,060 B2
(45) Date of Patent: Apr. 13, 2010

(54) ROTARY SHUTTER ASSEMBLIES FOR IMAGING PHOTOMETERS AND METHODS FOR USING SUCH SHUTTER ASSEMBLIES

(75) Inventors: Douglas Kreysar, Duvall, WA (US); Matthew Lekson, Woodinville, WA (US); Ronald F. Rykowski, Woodinville, WA (US); Richard E. Albrecht, Chapel Hill, NC (US)

(73) Assignee: Radiant Imaging, Inc., Duvall, WA (US)

( * ) Notice: Subject to any disclaimer, the term of this patent is extended or adjusted under 35 U.S.C. 154(b) by 851 days.

(21) Appl. No.: 11/344,452

(22) Filed: Jan. 30, 2006

(65) Prior Publication Data

US 2007/0177049 A1    Aug. 2, 2007

(51) Int. Cl.
*H04N 5/238* (2006.01)

(52) U.S. Cl. .................. 348/368; 348/362; 348/367; 396/452

(58) Field of Classification Search ......... 348/362–368; 394/452
See application file for complete search history.

(56) References Cited

U.S. PATENT DOCUMENTS

| | | | |
|---|---|---|---|
| 3,735,687 A | 5/1973 | Park | |
| 3,837,733 A | 9/1974 | Shoch et al. | |
| 4,057,810 A | 11/1977 | Iwata | |
| 4,301,476 A | 11/1981 | Keller et al. | |
| 4,408,338 A | 10/1983 | Grobman | |
| 4,536,069 A | 8/1985 | Kunica | |
| 4,571,629 A | 2/1986 | Horio et al. | |
| 4,576,456 A | 3/1986 | Okino et al. | |
| 4,581,515 A | 4/1986 | Egashira | |
| 4,616,911 A | 10/1986 | Zeth et al. | |
| 4,729,018 A * | 3/1988 | Watanabe et al. | 348/69 |
| 4,743,108 A | 5/1988 | Vogel et al. | |
| 5,539,488 A | 7/1996 | Erickson et al. | |
| 5,850,277 A | 12/1998 | Dang et al. | |
| 6,639,629 B1 * | 10/2003 | Takayama et al. | 348/364 |
| 6,663,561 B2 | 12/2003 | Sugimoto et al. | |
| 6,850,351 B1 | 2/2005 | Djachiachvili | |

FOREIGN PATENT DOCUMENTS

JP     62245236 A  *  10/1987

* cited by examiner

*Primary Examiner*—David L Ometz
*Assistant Examiner*—Antoinette T Spinks
(74) *Attorney, Agent, or Firm*—Perkins Coie LLP (57) ABSTRACT

Rotary shutter assemblies for imaging photometers and methods for using such shutters are disclosed herein. In one embodiment, for example, a method for capturing an image with an imaging photometer can include positioning a rotary shutter having an aperture at a first position such that the shutter blocks light traveling along an optical axis from a light source being measured to an image sensor of the photometer. The method can include pivotably moving the shutter at a generally constant angular speed to a second position with the aperture aligned with the optical axis to expose at least a portion of the image sensor to the light for a first predetermined exposure time. After exposing each portion of the image sensor to the light for the first exposure time, the method can include pivotably moving the shutter at the angular speed to a third position such the aperture is not aligned the optical axis, and then pivotably moving the shutter from the third position back to the first position without rotating the shutter 360 degrees.

34 Claims, 5 Drawing Sheets

ROTARY SHUTTER ASSEMBLIES FOR IMAGING PHOTOMETERS AND METHODS FOR USING SUCH SHUTTER ASSEMBLIES

TECHNICAL FIELD

The present invention is directed generally toward shutter assemblies for imaging photometers and methods for using such shutter assemblies.

BACKGROUND

Imaging devices, such as imaging photometers and other types of digital cameras, generally include a lens assembly, a shutter, and an image sensor (e.g., a charge coupled device (CCD) or a complementary metal oxide semiconductor (CMOS) device). In operation, an imaging device is positioned at a desired location relative to a light source (e.g., a visual display) to be measured and a user activates the device to capture an image measurement of the light source for a desired exposure time. During each individual exposure period, the lens assembly, mechanical shutter, and image sensor are all aligned along an optical axis and light from the light source can pass along the optical axis to impinge upon the image sensor.

The traditional type of mechanical shutter in many conventional imaging devices is an iris shutter. Such shutters use two or more blades that overlap each other and open apart and close together at a desired exposure rate to expose portions of the image sensor to the light from the light source being imaged. One drawback with this type of shutter, however, is that it generally exposes different parts of the image sensor for different lengths of time. For example, the center portion of the image sensor is generally exposed for a longer time than the outer portions of the image sensor as the shutter blades move outwardly from a closed position to an open position. The difference in exposure times can introduce significant errors into the image measurement. For example, in conventional iris shutter systems with a desired exposure time of 100 milliseconds, the shutter blades can take 5 milliseconds to completely open for the exposure, and another 5 milliseconds to completely close again at the end of the desired exposure time. The opening/closing times can accordingly introduce up to a 10% error in the image measurement because different portions of the image sensor are exposed to the light source for different periods of time. In order to minimize this error, it is often necessary to use relatively longer exposures and, accordingly, systems with iris shutters can be unsuitable for many applications where short exposure times are desired. Another drawback with iris shutters is that such systems include many moving parts that are constantly rubbing against each other and generally require a significant amount of maintenance and/or replacement.

Conventional imaging devices can also include an electronic shutter. This type of shutter operates by constantly flushing the detectors or pixels of the image sensor so that the sensor does not hold an electrical charge. During an exposure period, the flushing process is paused and an electrical charge is allowed to build up until the end of the desired exposure time. The charge is then discharged and the values are read by a suitable controller. Although electronic shutters do not generally have many of the above-described problems that plague systems including iris shutters, many types of high performance CCDs cannot utilize electronic shuttering and require mechanical shutters. Accordingly, there is a need to improve the mechanical shutter systems for high performance imaging devices.

DETAILED DESCRIPTION

A. Overview

The present disclosure describes rotary shutter assemblies for imaging photometers and methods for using such shutters. In one particular embodiment, for example, a method for capturing an image with an imaging photometer can include positioning a rotary shutter having an aperture at a first position such that the shutter blocks light traveling along an optical axis from a light source being measured to an image sensor of the photometer. The method can also include pivotably moving the shutter at a generally constant angular speed to a second position such that the aperture is aligned with the optical axis to expose at least a portion of the image sensor to the light for a first predetermined exposure time. After exposing each portion of the image sensor to the light for the first exposure time, the method can further include pivotably moving the shutter at the angular speed to a third position such that the aperture is not aligned with the optical axis and the shutter blocks light traveling along the optical axis toward the image sensor. The method can also include pivotably moving the shutter from the third position back to the second position to expose at least a portion of the image sensor to the light for a second predetermined exposure time. The shutter is pivotably moved from the third position back to the second position without rotating the shutter 360 degrees. After exposing each portion of the image sensor to the light for the second exposure time, the method can further include pivotably moving the shutter at the angular speed back to the first position.

Another embodiment is directed to a method for capturing an image measurement from a light source with an imaging photometer. The photometer can include a rotary shutter having an aperture, one or more filters, and an image sensor having an array of pixels. The shutter and one or more filters are positioned along an optical axis between the light source and the image sensor. The method can include rotatably moving the shutter at a generally constant rotational velocity from a first position where the shutter blocks light traveling along the optical axis toward the image sensor to a second position with the aperture aligned with the optical axis. When the shutter is in the second position, at least a portion of the array of pixels is exposed to light traveling along the optical axis. The method can also include passing the light traveling along the optical axis through one or more color filters and/or one or more neutral density filters after the light passes through the aperture and before the light impinges upon the image sensor.

The method can further include rotatably moving the shutter at the rotational velocity to a third position after exposing each portion of the array of pixels to the light for a desired exposure time. In the third position, the aperture is out of alignment with the optical axis such that the shutter again blocks light traveling along the optical axis toward the image sensor.

Several embodiments of the invention are also directed to imaging photometers. For example, one embodiment of an imaging photometer can include an image sensor with an array of pixels and a lens assembly positioned along an optical axis between a light source being measured and the image sensor. The photometer can also include a rotary shutter between the lens assembly and the image sensor. The shutter includes an aperture configured to pivotably move about a shutter axis at a generally constant angular speed from a first position out of alignment with the optical axis to a second position in which the aperture is at least partially aligned with the optical axis for a desired exposure time to allow light from the light source to pass along the optical axis toward the image sensor. The shutter can then pivotably move back to the first position without rotating 360 degrees about the shutter axis.

Many specific details of certain embodiments of the invention are set forth in the following description and in FIGS. 1A-3C to provide a thorough understanding of these embodiments. A person skilled in the art, however, will understand that the invention may be practiced without several of these details or additional details can be added to the invention. Well-known structures and functions have not been shown or described in detail to avoid unnecessarily obscuring the description of the embodiments of the invention. Where the context permits, singular or plural terms may also include the plural or singular term, respectively. Moreover, unless the word "or" is expressly limited to mean only a single item exclusive from the other items in reference to a list of two or more items, then the use of "or" in such a list is to be interpreted as including (a) any single item in the list, (b) all of the items in the list, or (c) any combination of the items in the list. Additionally, the term "comprising" is used throughout to mean including at least the recited feature(s) such that any greater number of the same feature and/or additional types of features are not precluded.

Figure 1A:
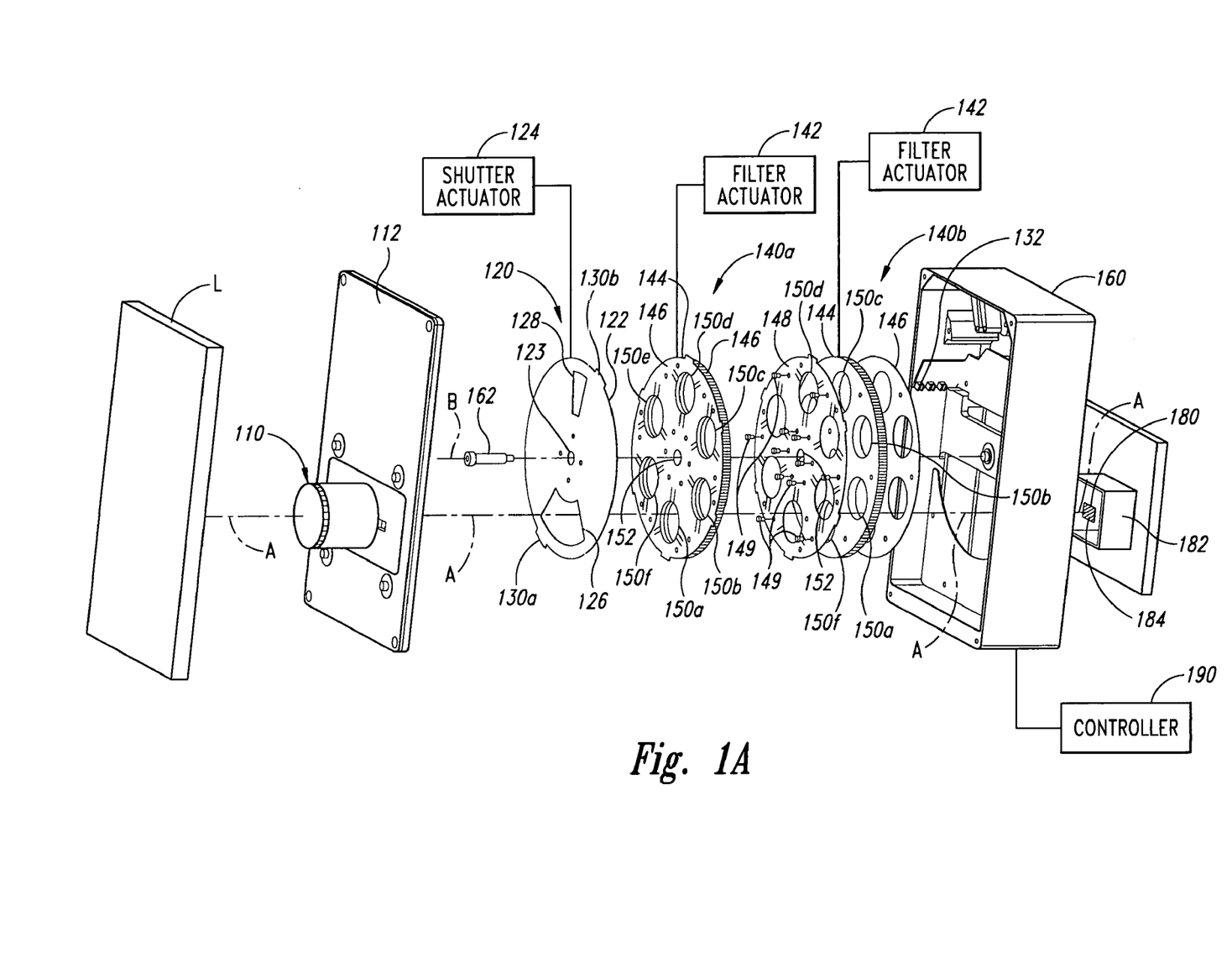
FIG. 1A is a partially schematic, exploded view of an imaging photometer including a rotary shutter assembly configured in accordance with an embodiment of the invention.

B. Embodiments of Shutter Assemblies for Imaging Photometers and Methods for Using Such Shutters FIG. 1A is a partially schematic, exploded view of an imaging photometer 100 including a rotary shutter assembly 120 configured in accordance with an embodiment of the invention. The photometer 100 is positioned at a desired location relative to a light source L (shown schematically) and is configured to capture one or more image measurements from the light source L. As discussed in greater detail below, the rotary shutter assembly 120 is configured to rotatably move about an axis to allow light traveling through the photometer 100 along an optical axis A to be imaged upon an image sensor 180 within the photometer for a desired exposure time. Compared with conventional shutter systems described above, the rotary shutter assembly 120 is expected to allow for extremely short exposure times (e.g., about 10 milliseconds) and significantly improve the accuracy of image measurements having such exposure times.

The photometer 100 can include an imaging lens assembly 110 releasably coupled to a cover unit 112. The lens assembly 110 can include one or more lenses and/or optical elements configured to shape, size, and/or condition the light from the light source L before directing the light along the optical axis A toward the shutter assembly 120. The lens assembly 110, for example, can include a standard fixed focal length lens, a zoom lens, or a microscopic lens. In other embodiments, however, different types of lenses can be used as long as the particular lens provides sufficient resolution and field-of-view for the photometer 100 to adequately capture image data from the light source L.

Figure 1B:
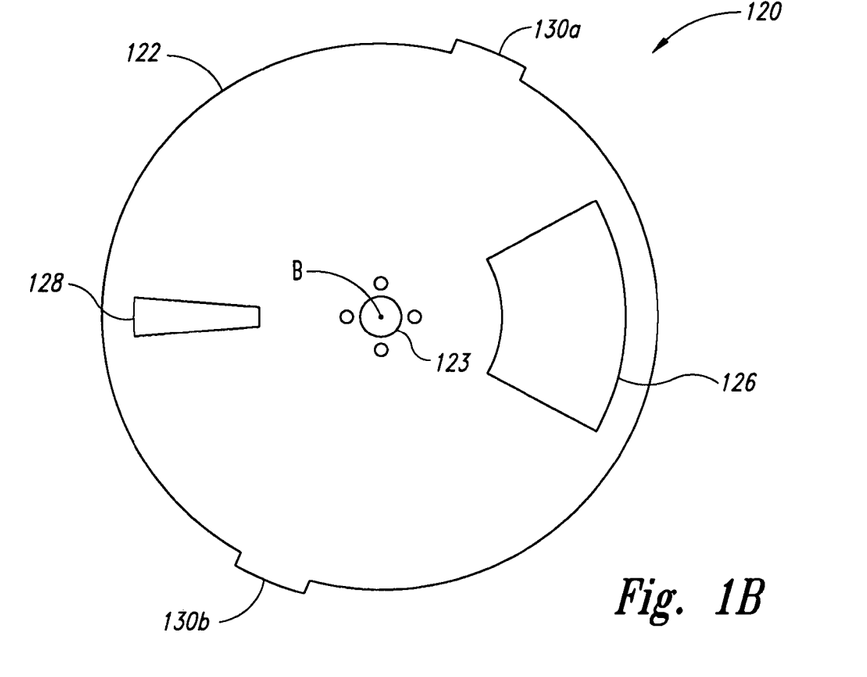
FIG. 1B is a plan view of the shutter assembly of FIG. 1A.

FIG. 1B is a plan view of the rotary shutter assembly 120. Referring to FIGS. 1A and 1B together, the shutter assembly 120 can include a shutter or disk 122 operably coupled to a shutter actuator 124 (shown schematically). The shutter 122 can include a first aperture 126 and a second aperture 128 arranged circumferentially about a central aperture 123 of the shutter 122. In the illustrated embodiment, for example, the first aperture 126 and second aperture 128 are spaced diametrically opposite one another. The first and second apertures 126 and 128 each have a "wedge" or "pie" shape. In other embodiments, however, the first and second apertures 126 and 128 can have different shapes, such as slits or other types of openings.

In one particular aspect of this embodiment, the first aperture 126 is substantially larger than the second aperture 128. As discussed in greater detail below With reference to FIGS. 2A-3C, the first aperture 126 can be used during a "stop-and-go" mode of the photometer 100, while the smaller second aperture 128 can be used during a "sweep" mode of the photometer 100. In other embodiments, the first and apertures 126 and 128 can have other arrangements relative to each other and/or the first and second apertures 126 and 128 can be different sizes. In still further embodiments, the shutter 122 can include a different number of apertures.

The shutter actuator 124 can include a motor or another suitable actuating device configured to rotatably or pivotably move the shutter 122 both clockwise and counterclockwise about an axis B extending through the central aperture 123 of the shutter 122. The shutter actuator 124, for example, can rotatably move the shutter 122 about the axis B at a desired angular or rotational speed. The rotational speed of the shutter 122 can vary based on the desired exposure rate. For example, fast exposure times generally require high angular speeds, while relatively slow exposure times generally require slower angular speeds. Although the angular speed of the shutter 122 can vary significantly based on the desired exposure rate, the shutter 122 is rotated at a generally constant rate regardless of the angular speed.

The shutter 122 can also include one or more tabs or indexing portions 130 (two are shown in the illustrated embodiment as tab 130a and 130b) and a sensor 132 configured to indicate the precise position and alignment of the shutter 122. The tabs 130a and 130b, for example, can be used to determine the exact position of the first and second apertures 126 and 128 relative to the optical axis A as the shutter 122 rotatably moves about the axis B at the desired angular speed. In other embodiments, the shutter 122 can include a different number or arrangement of tabs 130, or the shutter may include a different type of indexing system and/or sensor 132 to accurately locate the position of the shutter with respect to the optical axis A and/or the other components of the photometer 100.

The photometer 100 can also include a first filter wheel assembly 140a and a second filter wheel assembly 140b. The first filter wheel 140a and the second filter wheel 140b can be generally similar, however, for illustrative purposes the first filter wheel 140a is shown in a generally assembled state while the second filter wheel 140b is shown in a generally disassembled, exploded state. The first and second filter wheels 140a and 140b are each operably coupled to a filter actuator 142 (shown schematically). The filter actuators 142 can be generally similar to the shutter actuator 124 described previously. In other embodiments, however, the filter actuators 142 can have different features than the shutter actuator 124.

The first and second filter wheels 140a and 140b can each include a body portion 144 between a base plate 146 and a cover plate 148. The base plates 146 and cover plates 148, for example, can include metal plates that protect and support the corresponding body portions 144 and, as described below, the one or more filters carried by the body portions 144. A plurality of fasteners 149 can be used to releasably secure the corresponding cover plates 148 to the body portions 144 and base plates 146.

The body portions 144 (and the corresponding base plates 146 and cover plates 148) include a plurality of filter apertures 150 (six are shown as 150a-f) arranged circumferentially about a central aperture 152. The filter apertures 150a-f are configured to releasably hold various types of filters. In the illustrated embodiment, for example, one or more color filters (not shown) can be carried by the first filter wheel 140a and one or more neutral density filters (not shown) can be carried by the second filter wheel 140b. In other embodiments, however, the arrangement of the filters within the first and second filter wheels 140a and 140b can be different.

The color filters can include a wide range of filter types that have a desired color spectrum and/or wavelength range. In one embodiment, for example, the first filter wheel 140a can include a red filter, a green filter, and a blue filter carried by the filter apertures 150 in a desired arrangement. The additional filter apertures 150 can carry "clear" filters that do not generally affect or manipulate the light traveling along the optical axis A. In other embodiments, the color filters can include different types of filters and/or the filters can have a number of different arrangements on the first filter wheel 140a.

The neutral density filters (often referred to as "gray filters" or "ND filters") carried by the second filter wheel 140b can include light filters that decrease the intensity of light traveling along the optical axis A without generally altering the relative spectral distribution of the energy. Such filters are used to filter the entire visible spectrum evenly, thus allowing light reduction without generally influencing color or contrast. Neutral density filters can reduce transmission using either reflection or absorption. Reflective neutral density filters, for example, use partial reflection to reduce light transmission evenly, while absorptive neutral density filters use partial absorption to reduce the light transmission. In other embodiments, the second filter wheel 140b can include different types of filters. It will be appreciated that the photometer 100 can image a wide range of light levels using the rotary shutter assembly 120 (which can allow for very short to very long exposure times) in cooperation with a number of different neutral density filters.

The shutter assembly 120, first filter wheel 140a, and second filter wheel 140b can be rotatably mounted to a camera housing 160 with a suitable fastener 162 that projects along the axis B through the central aperture 123 of the shutter assembly 120 and the central apertures 152 of the first and second filter wheels 140a and 140b. The shutter assembly 120 and the first and second filter wheels 140a and 140b can accordingly rotatably move about the axis B in a correlated manner to precisely align the shutter assembly 120 and one or more desired filters with the optical axis A.

The image sensor 180 is carried by a sensor housing 182 configured to be releasably attached to the camera housing 160. The image sensor 180 can include a CCD imaging array 184 having a plurality of pixels or detectors arranged in a two-dimensional grid array. The pixels are light-sensitive cells capable of producing an electrical charge proportional to the amount of light they receive. The number of pixels in a horizontal or x-direction and a vertical or y-direction constitute the resolution of the CCD imaging array 184. The resolution of the CCD imaging array 184 should be sufficient to capture a desired imaging area of the light source L. In other embodiments, the CCD imaging array 184 can have a different arrangement of pixels or the imaging array can include a CMOS image sensor.

The photometer 100 can further include a controller 190 configured to precisely coordinate the movement of the shutter assembly 120 and the first and second filter wheels 140a and 140b such that (a) the first or second apertures 126 and 128 of the shutter 122 and (b) the filters of the first and second filter wheels 140a and 140b are aligned with the optical axis A for image measurement. The controller 190 can also be operably coupled to the image sensor 180 to collect, organize, and/or calibrate the image measurement data.

Figure 2A:
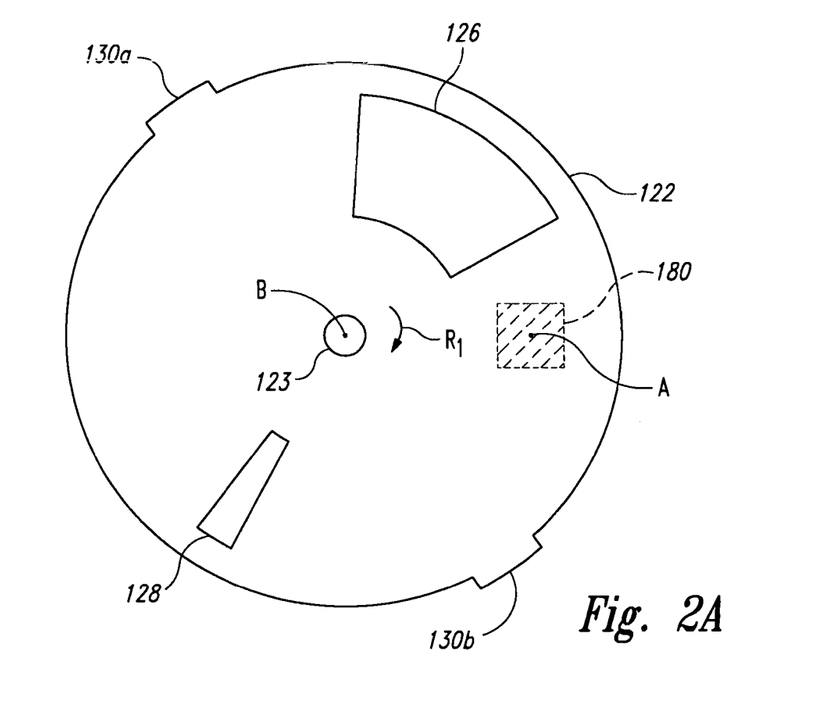
FIGS. 2A-2C illustrate various stages in a method for capturing an image from a light source using the imaging photometer and rotary shutter assembly of FIGS. 1A and 1B in accordance with an embodiment of the invention.
Figure 2B:
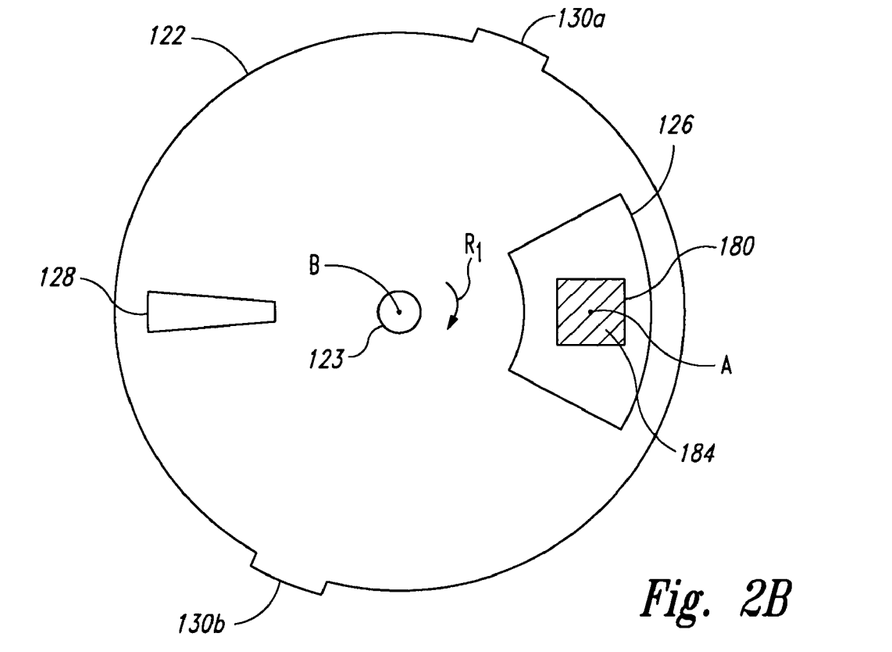
Figure 2C:
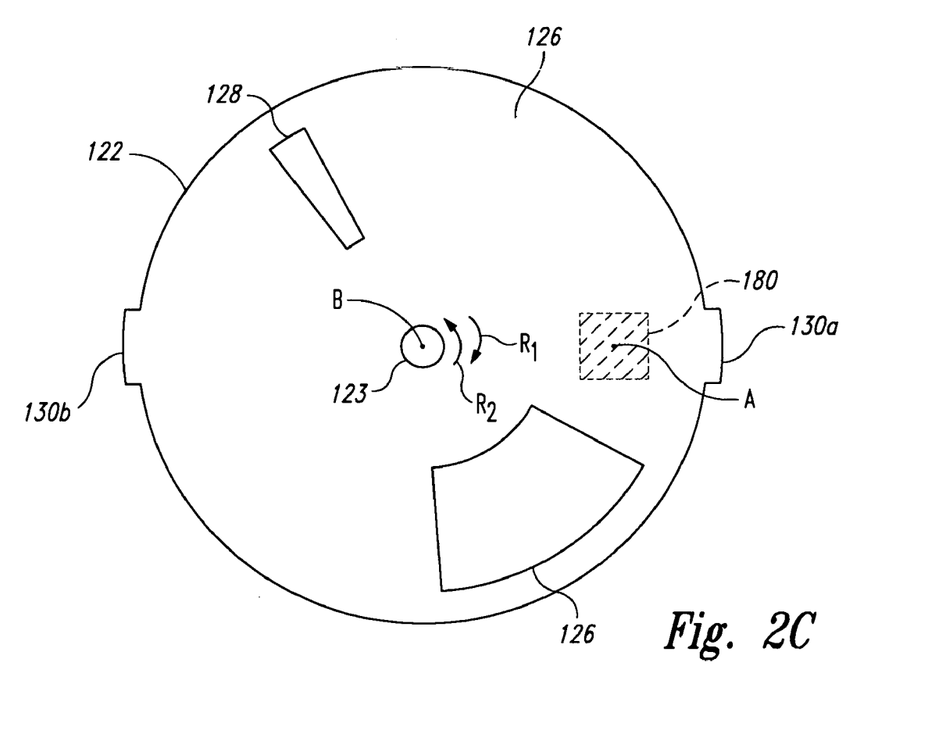

FIGS. 2A-2C illustrate various stages in a method for capturing an image from the light source L using the imaging photometer 100 and rotary shutter assembly 120 described above with reference to FIGS. 1A and 1B. More specifically, FIG. 2A is a plan view of the shutter 122 at an initial stage of the method with the shutter 122 at a first position where the first and second apertures 126 and 128 are out of alignment with the optical axis A. In this position, the shutter 122 accordingly blocks light traveling from the light source L (FIG. 1A) toward the image sensor 180. The shutter 122 is configured to rotatably or pivotably move about the axis B (as shown by the arrow $R_1$) at a desired generally constant angular speed.

Referring next to FIG. 2B, the shutter 122 has been rotatably moved in the direction $R_1$ at the desired angular speed until the first aperture 126 is aligned with the optical axis B and the image sensor 180. In one aspect of this embodiment, the shutter 122 can be stopped momentarily at this position (i.e., an exposure position) and the entire imaging array 184 can be exposed to light traveling along the optical axis B for a predetermined exposure time. The exposure time can vary from short exposure times for imaging high level light to long exposure times for imaging low level light.

When the exposure time is complete, the shutter 122 can again be rotatably moved in the direction $R_1$ at the same generally constant angular speed. Referring to FIG. 2C, for example, the shutter 122 has been rotated to a second position such that the first and second apertures 126 and 128 are again out of alignment with the optical axis A and, accordingly, the shutter 122 again blocks light traveling along the optical axis A toward the image sensor 180.

In several embodiments, the shutter 122 can be rotated from the second position back to the first position in a counterclockwise position (as shown by the arrow $R_2$) at the same generally constant angular speed. The shutter 122 can again be stopped when the first aperture 126 is aligned with the optical axis B and the image sensor 180 and another image measurement can be taken. After the desired exposure time, the shutter 122 can continue to be rotatably moved counterclockwise back to the first position.

One feature of the method described above with respect to FIGS. 2A-2C is that each pixel of the imaging array 184 is exposed to the light from the light source L during exposure because the first aperture 126 is dimensioned such that the entire image sensor 180 is visible when the shutter 122 is at the exposure position. One advantage of this feature is that the shutter 122 is expected to minimize and/or eliminate errors in image measurements compared with conventional imaging devices using iris shutters or electronic shutters because each portion of the imaging array 184 is exposed to the light for the same exposure time.

Figure 3A:
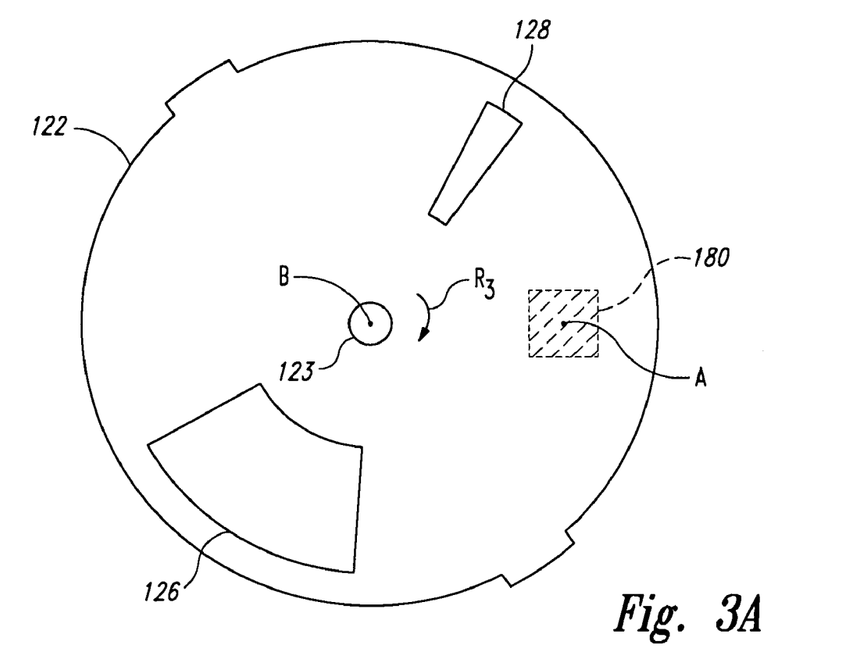
FIGS. 3A-3C illustrate various stages in a method for capturing an image from a light source using the imaging photometer and rotary shutter assembly of FIGS. 1A and 1B in accordance with another embodiment of the invention.
Figure 3B:
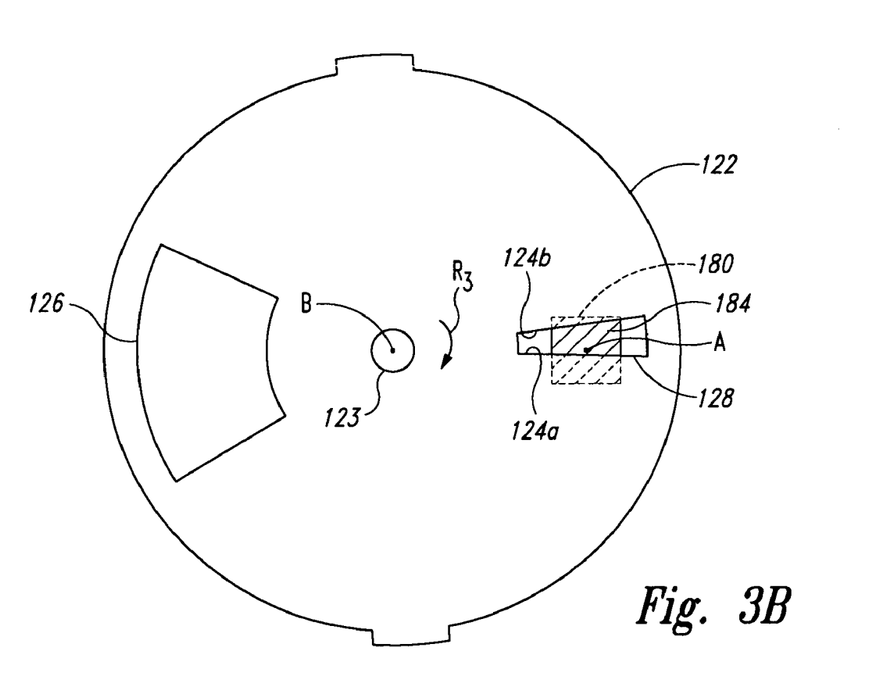
Figure 3C:
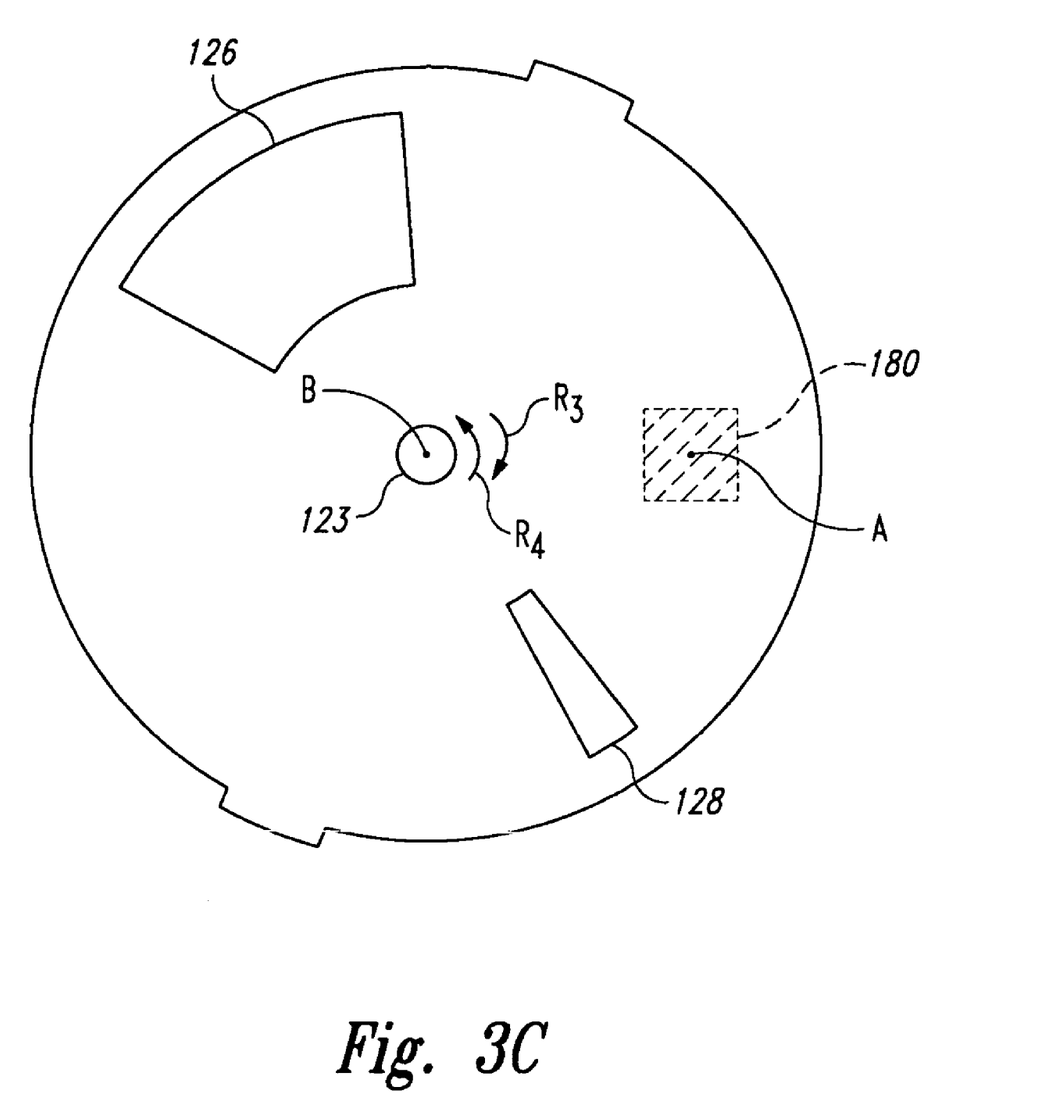

FIGS. 3A-3C illustrate various stages in a method for capturing an image from the light source L using the imaging photometer 100 and rotary shutter assembly 120 in accordance with another embodiment of the invention. More specifically, FIG. 3A is a plan view of the shutter 122 at an initial stage of this method before capturing an image measurement of the light source L. The initial stage of this method can be generally similar to the initial stage of the method described above with reference to FIG. 2A. For example, the first and second apertures 126 and 128 of the shutter 122 are at a first position out of alignment with the optical axis A such that the shutter 122 blocks light traveling from the light source L (FIG. 1A) toward the image sensor 180. The shutter 122 is configured to rotatably or pivotably move clockwise (as shown by the arrow $R_3$) about the axis B at a desired generally constant angular speed. In one aspect of this embodiment, the second aperture 128 (rather than the first aperture 126) is positioned to move or sweep across the image sensor 180 during the exposure time.

Referring next to FIG. 3B, for example, the shutter 122 has been rotatably moved in the direction $R_3$ at the desired angular speed until the second aperture 128 is aligned with the optical axis A and a portion of the image sensor 180. The second aperture 128 is dimensioned such that it is smaller than the image sensor 180 and, accordingly, the entire imaging array 184 can not be aligned with the second aperture 128 for an image measurement. Instead, the second aperture 128 is rotatably moved at the generally constant angular speed until the second aperture 128 has swept or moved across the entire imaging array 184 and each pixel of the array has been exposed to the light from the same exposure time. For example, the exposure time for each portion of the image sensor 180 can be equal to the difference between a first time at which a leading edge 129a of the second aperture 128 passes over any pixel of the imaging array 184 to a second time when a trailing edge 129b of the second aperture 128 passes over the same pixel of the array.

Referring next to FIG. 3C, the exposure time is complete and the shutter 122 has been rotated to a second position such that the first and second apertures 126 and 128 are again out of alignment with the optical axis A. The shutter 122 again blocks light traveling along the optical axis A toward the image sensor 180.

In several embodiments, the shutter 122 can be rotated from the second position back to the first position in a counterclockwise position (as shown by the arrow $R_4$) at the same generally constant angular speed. The shutter 122 can again move or sweep across the imaging array 184 such that each portion of the array is exposed to the light traveling along the optical axis for the same exposure time. The shutter 122 can continue to be rotatably moved counterclockwise back to the first position.

One feature of the method described above with respect to FIGS. 3A-3C is that the shutter 122 is rotated at the same generally constant angular speed as the shutter moves from the first position and sweeps across the imaging array 184 to the second position. One advantage of this feature is that each pixel of the imaging array 184 will be exposed to the light for the same exposure time because the shutter 122 is moving or sweeping across the entire pixel array at the same rate. Another advantage of this feature is that the exposure times can be the same across the entire imaging array 184 regardless of the dimensions of the second aperture 128 or the angular speed of the shutter 122. So long as the shutter 122 is rotated at a generally constant angular speed, the aperture can be smaller and/or larger than the second aperture 128 in the illustrated embodiment.

Another feature of the method described above with respect to FIGS. 3A-3C is that the shutter 122 is expected to allow for accurate results at generally shorter exposure times than those of systems including conventional iris shutters. The photometer 100 including the shutter 122, for example, can provide accurate results for exposure times as fast as about 10 milliseconds. One advantage of this feature is that the photometer 100 with the shutter 122 can be used for a wide number of applications requiring extremely fast exposure times in which conventional imaging devices were generally unsuitable because of the errors associated with conventional mechanical shutters. At the same time, by using the "stop-and-go" technique described above, long exposures are still available for low light levels.

From the foregoing, it will be appreciated that specific embodiments of the invention have been described herein for purposes of illustration, but that various modifications may be made without deviating from the invention. For example, the imaging photometer 100 can include other features and/or the features described above can have a different arrangement within the photometer. In still further embodiments, the shutter assembly 120 described above can be used in other suitable imaging devices. Aspects of the invention described in the context of particular embodiments may be combined or eliminated in other embodiments. Further, while advantages associated with certain embodiments of the invention have been described in the context of those embodiments, other embodiments may also exhibit such advantages, and not all embodiments need necessarily exhibit such advantages to fall within the scope of the invention. Accordingly, the invention is not limited except as by the appended claims.

We claim:

1. A method for capturing an image with an imaging photometer, the method comprising:

positioning a single rotary shutter having an aperture at a first position such that the shutter blocks light traveling along an optical axis from a light source being measured to an image sensor of the photometer, wherein the shutter is between an imaging lens assembly of the photometer and the image sensor;

pivotably moving the shutter at a generally constant angular speed to a second position such that the aperture is aligned with the optical axis to expose at least a portion of the image sensor to the light for a first predetermined exposure time;

after exposing each portion of the image sensor to the light for the first exposure time, pivotably moving the shutter at the angular speed to a third position such that the aperture is not aligned with the optical axis and the shutter blocks light traveling along the optical axis toward the image sensor;

pivotably moving the shutter from the third position back to the second position to expose at least a portion of the image sensor to the light for a second predetermined exposure time without rotating the shutter 360 degrees; and after exposing each portion of the image sensor to the light for the second exposure time, pivotably moving the shutter at the angular speed back to the first position.

2. The method of claim 1 wherein:

pivotably moving the shutter at the angular speed from the first position toward the third position includes moving the shutter in a clockwise direction; and pivotably moving the shutter from the third position toward the first position includes moving the shutter in a counterclockwise direction.

3. The method of claim 1, further comprising passing the light traveling along the optical axis through one or more filters after the light passes through the aperture and before the light impinges upon the image sensor.

4. The method of claim 1, further comprising passing the light traveling along the optical axis through one or more color filters after the light passes through the aperture and before the light impinges upon the image sensor.

5. The method of claim 1, further comprising passing the light traveling along the optical axis through one or more neutral density filters after the light passes through the aperture and before the light impinges upon the image sensor.

6. The method of claim 1, further comprising:
passing the light traveling along the optical axis through one or more color filters after the light passes through the aperture and before the light impinges upon the image sensor; and
passing the light traveling along the optical axis through one or more neutral density filters after the light passes through the one or more color filters and before the light impinges upon the image sensor.

7. The method of claim 1 wherein the aperture is dimensioned such that when the aperture is aligned with the optical axis, the entire image sensor is exposed to the light traveling along the optical axis, and wherein:
pivotably moving the shutter at a generally constant angular speed to a second position such that the aperture is aligned with the optical axis includes (a) pivoting the shutter at the angular speed to the second position in which the entire image sensor is exposed to the light, and (b) stopping the shutter at the second position and exposing the entire image sensor to the light for the first exposure time; and
pivotably moving the shutter at the angular speed to a third position includes pivoting the shutter from the second position to the third position at the angular speed when the first exposure time is complete.

8. The method of claim 1 wherein the aperture is dimensioned such that when the aperture is aligned with the optical axis, only a portion of the image sensor is exposed to the light traveling along the optical axis, and wherein:
pivotably moving the shutter at a generally constant angular speed to a second position such that the aperture is aligned with the optical axis includes (a) pivoting the shutter at the angular speed such that the aperture exposes a portion of the image sensor to the light for the first exposure time, and (b) pivoting the shutter at the angular speed toward the third position until each subsequent portion of the image sensor is exposed to the light for the first exposure time.

9. The method of claim 1 wherein pivotably moving the shutter at a generally constant angular speed to expose at least a portion of the image sensor to the light for a predetermined exposure time includes exposing each light-sensitive pixel of the image sensor to the light for the same period of time as the aperture pivotably sweeps across the image sensor.

10. The method of claim 1 wherein exposing the image sensor to the light for a predetermined exposure time includes exposing the image sensor to the light for about 10 milliseconds or more.

11. The method of claim 1 wherein the angular speed is a first angular speed, and wherein the method further comprises:

pivotably moving the shutter from the first position toward the third position at a second generally constant angular speed different than the first angular speed; and
pivotably moving the shutter from the third position back toward the first position at the second angular speed.

12. The method of claim 1 wherein positioning a rotary shutter having an aperture at a first position includes positioning a rotary shutter having a first aperture with a first dimension and a second aperture having a second dimension less than the first dimension at the first position.

13. The method of claim 12 wherein positioning a rotary shutter having a first aperture and a second aperture at the first position includes positioning a rotary shutter including a first generally wedge-shaped aperture having a first dimension and a second generally wedge-shaped aperture having a second dimension less than the first dimension at the first position.

14. The method of claim 1, further comprising providing an imaging photometer having a COD or CMOS image sensor.

15. A method for capturing an image measurement from a light source with an imaging photometer, the photometer including an imaging lens assembly, a single rotary shutter having an aperture, one or more filters, and an image sensor having an array of pixels, the shutter and one or more filters being positioned along an optical axis between the imaging lens assembly and the image sensor, the method comprising:
rotatably moving the shutter at a generally constant rotational velocity from a first position where the shutter blocks light traveling along the optical axis toward the image sensor to a second position with the aperture aligned with the optical axis such that at least a portion of the array of pixels is exposed to light traveling along the optical axis;
passing the light traveling along the optical axis through one or more color filters after the light passes through the aperture and before the light impinges upon the image sensor;
passing the light traveling along the optical axis through one or more neutral density filters after the light passes through the one or more color filters and before the light impinges upon the image sensor; and
rotatably moving the shutter at the rotational velocity to a third position with the aperture out of alignment with the optical axis such that the shutter blocks light traveling along the optical axis toward the image sensor after exposing each portion of the array of pixels to the light for a desired exposure time.

16. The method of claim 15 wherein the aperture is dimensioned such that when the aperture is aligned with the optical axis, the entire image sensor is exposed to the light traveling along the optical axis, and wherein:
rotatably moving the shutter at a generally constant rotational velocity from a first position to a second position includes (a) rotating the shutter at the rotational velocity to the second position in which the entire image sensor is exposed to the light, and (b) stopping the shutter at the second position and exposing the entire image sensor to the light for the predetermined exposure time; and
rotatably moving the shutter at the rotational velocity to a third position includes rotating the shutter from the second position to the third position at the rotational velocity when the predetermined exposure time is complete.

17. The method of claim 15 wherein the aperture is dimensioned such that when the aperture is aligned with the optical axis, only a portion of the image sensor is exposed to the light traveling along the optical axis, and wherein:

rotatably moving the shutter at a generally constant rotational velocity from a first position to a second position includes (a) rotating the shutter at the rotational velocity such that the aperture exposes only a portion of the image sensor to the light for the predetermined exposure time, and (b) rotating the shutter toward the third position at the rotational velocity until each subsequent portion of the image sensor is exposed to the light for the predetermined exposure time.

18. The method of claim 15 wherein rotatably moving the shutter at a generally constant rotational velocity from the first position to the third position includes exposing each light-sensitive pixel of the image sensor to the light for the same period of time as the aperture rotatably sweeps across the image sensor.

19. The method of claim 15 wherein exposing each portion of the array of pixels to the light for a desired exposure time includes exposing each portion of the array of pixels to the light for about 10 milliseconds or more.

20. The method of claim 15 wherein the generally constant rotational velocity is a first rotational velocity and the exposure time is a first exposure time, and wherein the method further comprises:
rotatably moving the shutter at a second generally constant rotational velocity from the third position back to the second position to expose at least a portion of the image sensor to the light for a second predetermined exposure time without rotating the shutter 360 degrees; and
after exposing each portion of the image sensor to the light for the second exposure time, rotatably moving the shutter at the second rotational velocity back to the first position.

21. A method for capturing an image of a light source with an imaging photometer having an image sensor with an array of pixels, a lens, and a single rotary shutter between the lens and the image sensor, the method comprising:
rotatably moving the single rotary shutter having a first aperture and a second aperture at a first generally constant rotational velocity from a first position where the shutter blocks light traveling from the light source along an optical axis to the image sensor to a second position such that the first aperture is aligned with the optical axis and the entire array of pixels is exposed to light traveling along the optical axis;
directing the light traveling along the optical axis through one or more color filters after the light passes through the first aperture and before the light impinges upon the image sensor;
directing the light traveling along the optical axis through one or more neutral density filters after the light passes through the one or more color filters and before the light impinges upon the image sensor;
exposing the image sensor to the light for a desired exposure time; and
rotatably moving the shutter at the first rotational velocity to a third position where the first aperture is not aligned with the optical axis and the shutter blocks light traveling along the optical axis.

22. The method of claim 21 wherein rotatably moving the shutter at the first rotational velocity to a third position where the first aperture is not aligned with the optical axis includes rotating the shutter from the second position to the third position at the first rotational velocity when the desired exposure time is complete such that each portion of the image sensor is exposed to the light for the desired exposure time.

23. The method of claim 21 wherein rotatably moving the shutter at the first rotational velocity to a third position where the first aperture is not aligned with the optical axis includes rotating the shutter from the second position toward the third position at the first rotational velocity when the desired exposure time is nearly complete such that each portion of the image sensor is exposed to the light for the desired exposure time as the first aperture rotatably moves across the image sensor.

24. The method of claim 21 wherein exposing the image sensor to the light for a desired exposure time includes exposing the image sensor to the light for about 10 milliseconds or more.

25. The method of claim 21 wherein the second aperture is dimensioned such that when the second aperture is aligned with the optical axis, only a portion of the image sensor is exposed to the light traveling along the optical axis, and wherein the method further comprises:
rotatably moving the shutter at the first rotational velocity until the second aperture is aligned with the optical axis and a portion of the array of pixels is exposed to the light; and
rotating the shutter at the first rotational velocity until each subsequent portion of the pixel array is exposed to the light for the desired exposure time.

26. The method of claim 21 wherein the exposure time is a first exposure time, and wherein the method further comprises:
rotatably moving the shutter at a second generally constant rotational velocity such that the aperture is aligned with the optical axis to expose at least a portion of the image sensor to the light for a second predetermined exposure time; and
after exposing each portion of the image sensor to the light for the second predetermined exposure time, rotatably moving the shutter at the second rotational velocity to the second position.

27. The method of claim 21 wherein rotatably moving a rotary shutter having a first aperture and a second aperture includes rotatably moving a shutter having a first generally wedge-shaped aperture having a first dimension and a second generally wedge-shaped aperture having a second dimension less than the first dimension.

28. The method of claim 21, further comprising providing an imaging photometer having a CCD or CMOS image sensor.

29. An imaging photometer, comprising:
an image sensor including an array of pixels;
a lens assembly positioned along an optical axis between a light source being measured and the image sensor;
a single rotary shutter between the lens assembly and the image sensor, the shutter including an aperture configured to pivotably move about a shutter axis at a generally constant angular speed from (a) a first position out of alignment with the optical axis to (b) a second position in which the aperture is at least partially aligned with the optical axis for a desired exposure time to allow light from the light source to pass along the optical axis toward the image sensor and (c) back to the first position without rotating 360 degrees about the shutter axis.

30. The imaging photometer of claim 29, further comprising one or more filter assemblies along the optical axis between the rotary shutter and the image sensor.

31. The imaging photometer of claim 30 wherein the one or more filter assemblies includes:
a first filter assembly including one or more color filters, the first filter assembly being configured to rotatably move about the shutter axis such that the one or more color filters can be at least partially aligned with the optical axis during the exposure period; and a second filter assembly including one or more neutral density filters, the second filter assembly being configured to rotatably move about the shutter axis such that the one or more neutral density filters can be aligned with the optical axis during the exposure period.

32. The imaging photometer of claim 29 wherein the image sensor includes a COD or a CMOS image sensor.

33. The imaging photometer of claim 29 wherein the aperture is a first aperture having a first dimension, and wherein the rotary shutter further includes a second aperture having a second dimension less than the first dimension.

34. The imaging photometer of claim 29 wherein the aperture is a first generally wedge-shaped aperture having a first dimension, and wherein the rotary shutter further includes a second generally wedge-shaped aperture having a second dimension less than the first dimension.

\* \* \* \* \*